Patented May 23, 1933

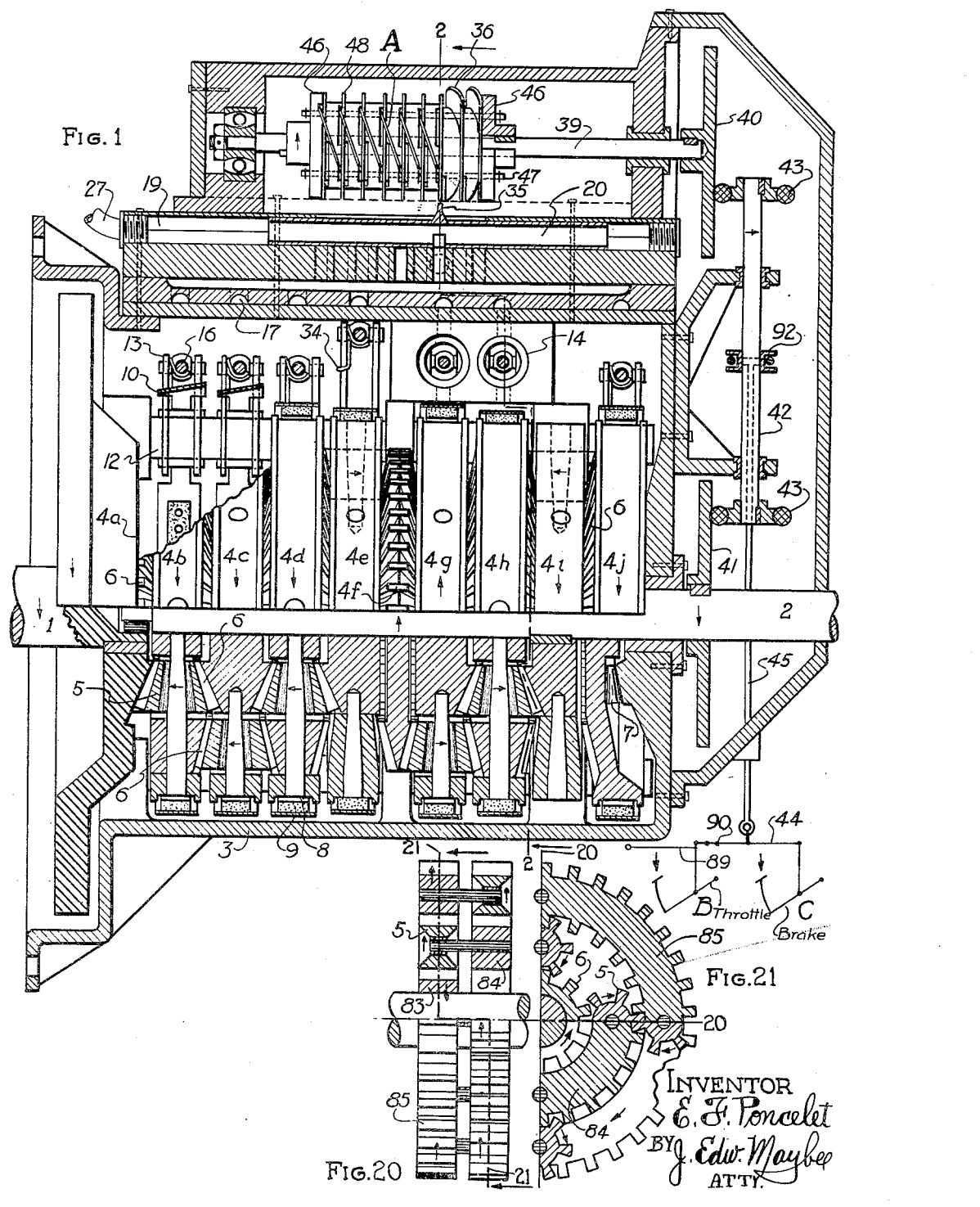

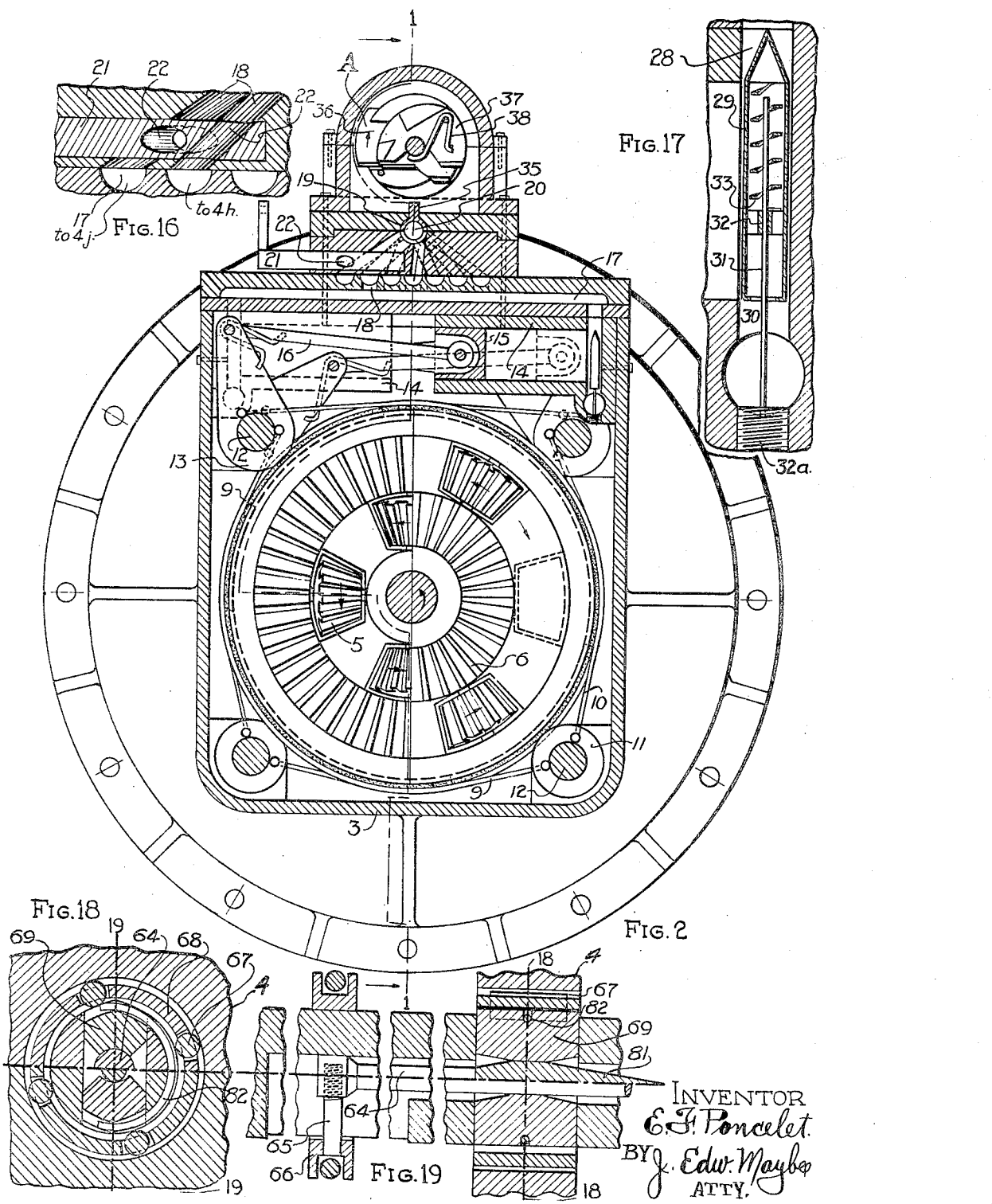

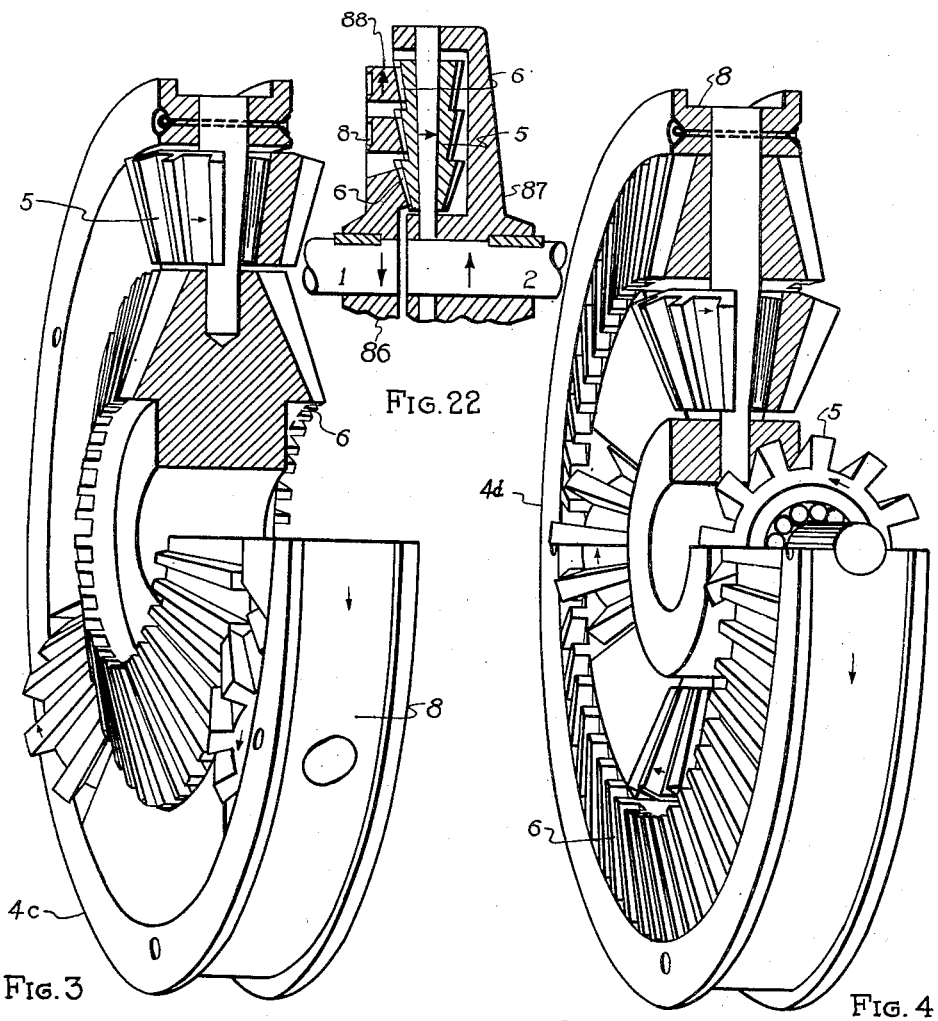
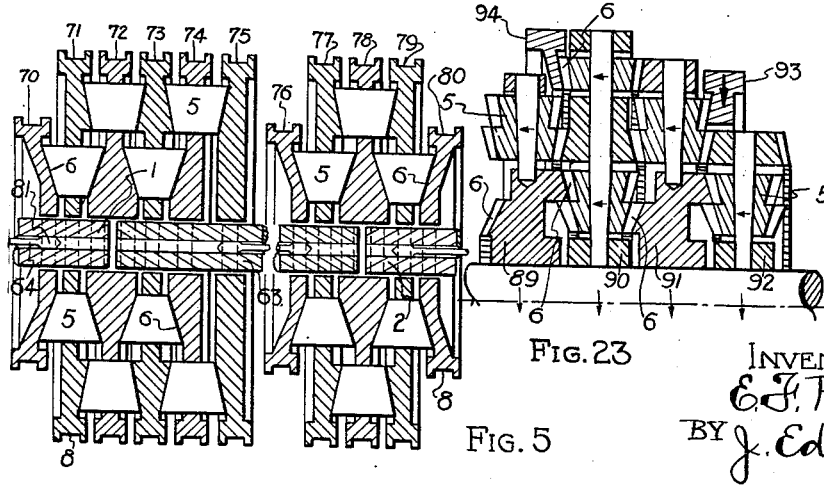

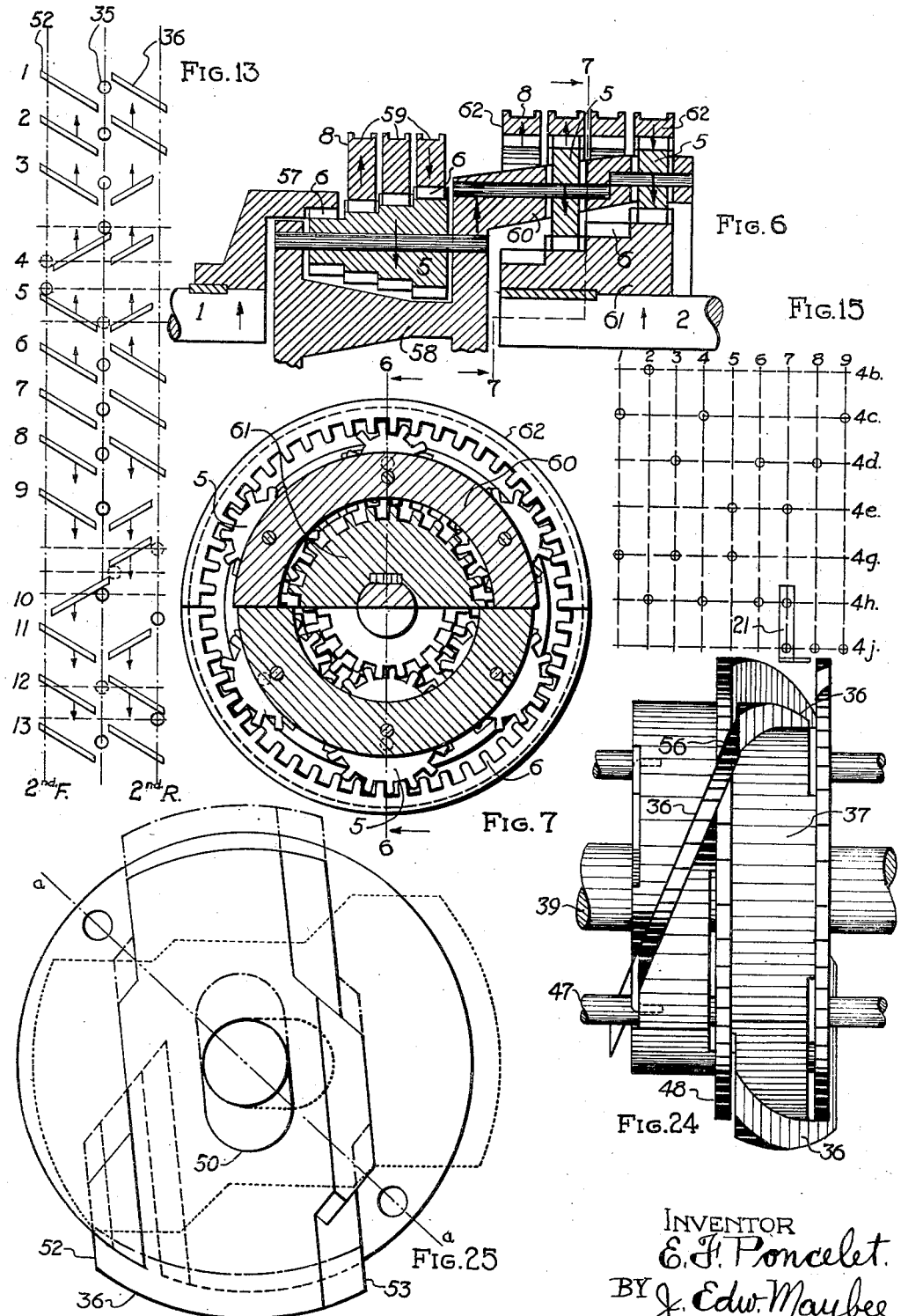

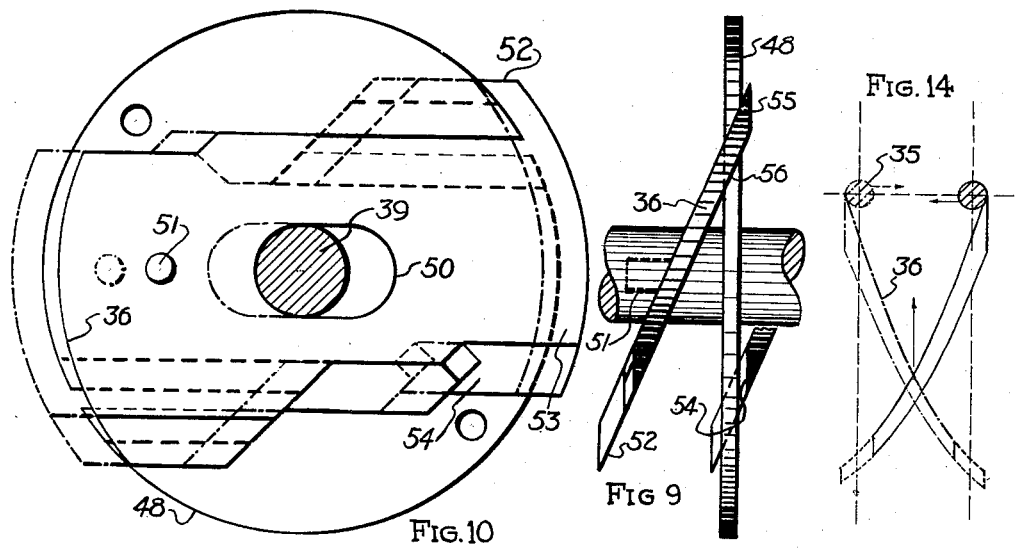
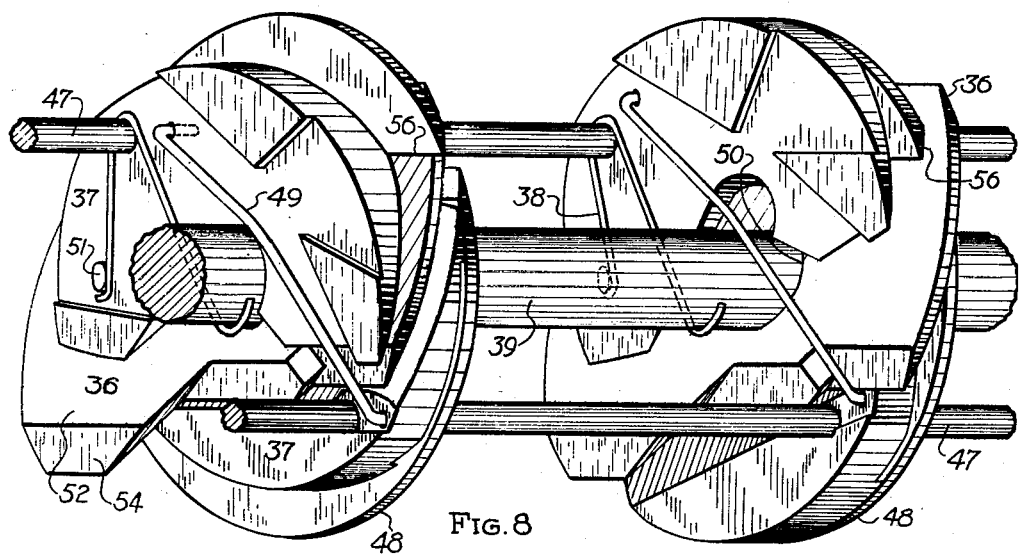
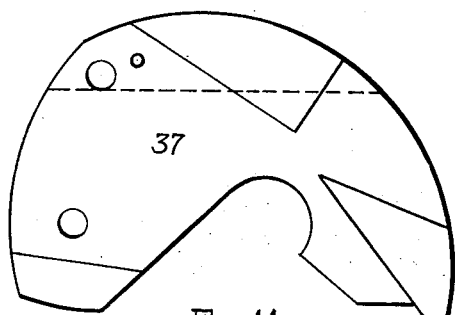
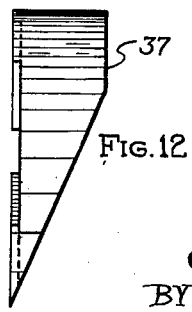

1,910,180

UNITED STATES PATENT OFFICE

EUGENE F. PONCELET, OF TORONTO, ONTARIO, CANADA

TORSIONAL CONSTANT-MESH POWER TRANSMISSION

Application filed July 31, 1931. Serial No. 554,253.

This invention relates to gearing adapted to be positioned between a prime mover and a load shaft to obtain different speed ratios between the two, and my object is to devise gearing which will give a satisfactory range of speed ratios without requiring the shifting of gears into and out of mesh. More particularly my object is to devise a substitute for the ordinary gear box of an automobile which will give practically a continuous change of gear ratio, though employing mechanism having a series of fixed gear ratios and which will enable gear ratios to be selectively and rapidly changed at any speed and without gear clash.

I attain this object in the manner hereinafter set forth by means of constructions which may be briefly described as follows referring to a preferred form of the device.

The drive shaft and load shaft are arranged in alinement and on them are rotatably mounted what may be termed a torsion lever comprising torsion elements, the body of one of which is keyed or clutched to the drive shaft and another has a driving connection with the load shaft.

Other elements in the series are adapted to be immobilized by clutching engagements between their bodies and a stationary part. Certain of the torsion elements are provided with gear rings and others with both gear rings and an idler pinion or pinions meshing with the gear rings of other elements at one or both sides as the case may be. Any one of the torsion elements having an idler meshing with two other elements all on the same axis form what I term a torsional unit. What I term a torsion lever comprises, at least, three elements, any one of which forms a unit with two others and has its movement totally dependent on the movements of any two others. The respective elements of a unit may thus be driven directly by a rotating part, may be driven by the idler set of a preceding unit which meshes with the gear ring of a third element or driven by its own idler when the gear rings of the adjacent elements with which the idler meshes have relative movement. When an element is immobilized it provides a fulcrum, that is an imaginary surface normal to the axis passing through the immobilized element, such that all the elements on one side rotate in the same direction and on the other side in the opposite direction. Elements when set in motion have different speeds, the speed increasing the farther away an element is from the fulcrum, the direction of movement being in one direction at one side of the fulcrum and in the opposite direction at the other side. The fulcrum gives a definite relation between the angular velocities of every element. Thus by immobilizing different elements different speed ratios may be obtained between the different ends of the torsion lever formed by a series of elements, thus modifying the definite relation between the angular velocities of all the elements.

To obtain a greater range of speeds a second torsion lever formed by a series of elements is employed certain of which may also be immobilized at will. The second lever may be coupled to the first by forming a connection, temporarily or permanently between an element of one lever and an element of the other which will maintain the two in the same relative position. By immobilizing the body of a free element of the first lever and a free element of the second lever various forward and various reverse speed ratios are obtainable. In order to obtain reverse direction of rotation of the load shaft the torsion elements of a torsion lever may be positioned so that the fulcrum may be positioned at will outside the flow of power, so that load and power elements are on the same side of the fulcrum.

Another object of my invention is to provide means for automatically changing the gear ratios, as necessary, to enable the prime mover to be operated at all times at substantially the optimum speed, that is, the speed at which the efficiency of the prime mover is greatest at the prevailing conditions.

This object I attain by providing speed responsive means for changing the gear ratios, which speed responsive means are actuated from either the power or load shaft, together with means whereby changes in variables which vary the optimum speed, such as the demand for power, also vary the intensity of the effect of the controlling shaft on the speed responsive mechanism.

A further object is to provide means whereby the braking effect of the engine is readily obtainable in any desired degree with substantial continuity of action. This object is attained by providing means whereby the speed responsive means gradually increases gear ratios without causing generation of power by the engine.

The invention is hereinafter more specifically described and is illustrated in the accompanying drawings in which Fig. 1 is a longitudinal section of one embodiment of my invention;

Fig. 2 a cross section of the same on the line 2—2 in Fig. 1;

Fig. 3 a perspective detail, partly broken away, of one of the torsion elements of Fig. 1;

Fig. 4 a similar view of another of the torsion elements of Fig. 1;

Fig. 5 a diagrammatic view illustrating the principles involved in the invention;

Fig. 6 a longitudinal section of a modified form of the invention;

Fig. 7 a section on the line 7—7 in Fig. 6;

Fig. 8 a perspective detail of part of the speed responsive gear changing mechanism;

Fig. 9 a front elevation of part of the same;

Fig. 10 a side elevation of the same parts;

Fig. 11 a face view of one of the centrifugal control segments;

Fig. 12 a side view of the same;

Figs. 13 and 14 diagrammatic views illustrating the operation of the speed responsive mechanism;

Fig. 15 a diagram illustrating the positions of the fulcrum elements relative to the positions of the piston valve which controls their immobilization;

Fig. 16 a sectional detail of the valve operable to condition the mechanism to control forward or reverse speed ratios;

Fig. 17 a sectional detail of the inlet and outlet valve of the hydraulic mechanisms for actuating the clutches;

Fig. 18 a cross section of clutch for connecting certain of the torsion elements to the drive and load shafts;

Fig. 19 a section on the line 19—19 in Fig. 18;

Fig. 20 a longitudinal section of a modified form of a torsion lever;

Fig. 21 a section on the line 21—21 in Fig. 20;

Fig. 22 a longitudinal section of another modification;

Fig. 23 a similar view of another modification;

Fig. 24 a front elevation showing more particularly the first reverse and forward drive cams of the speed-responsive mechanism; and Fig. 25 a front elevation showing the relationship between the forward and reverse drive cams of the speed responsive mechanism.

In the drawings like numerals of reference indicate corresponding parts in the different figures.

Referring particularly to Figs. 1, 2, 3 and 4 of the drawings, 1 is the drive shaft and 2 the load shaft mounted in alinement therewith in the frame or housing 3. On the shafts are mounted a series of torsion elements 4 which are distinguished in their order by the letters $a, b, c, d, e, f, g, h, i, j$. The element $4^a$ is shown as secured to the drive shaft 1. The element $4^j$ is shown as secured to the load shaft 2, and the remaining elements are free relative to the shafts but are capable of being immobilized at will as hereinafter described. In each unit one element carries an idler pinion or pinions 5 and the other two gear rings 6 with which the pinions mesh.

In what follows the expression "terminal element" is used to designate a power or load element which is first or last in the flow of power, as distinguished from "free" elements which being neither power or load elements are capable of being immobilized to form a fulcrum element.

In Fig. 1 the elements $4^a$ to $4^f$ constitute one torsion lever and the elements $4^f$ to $4^j$ a second torsion lever. Element $4^a$ is the first terminal element of the first lever, and is connected to the power shaft and forms also the engine flywheel. This element $4^a$ is provided with a gear ring 6 only, which gear ring meshes with the idler pinions of the second element $4^b$. This element is provided with a set of radially journalled idler pinions 5 meshing with the rings 6 of the elements at each side and a ring 6 meshing with the idler set of the element $4^c$.

This element is provided with a set of idler pinions meshing with the rings of the elements at each side and also with two rings meshing with the sets of idler pinions of the adjacent elements. This element is of the type shown in Fig. 3 with the set of idler pinions adjacent the periphery.

The next element $4^d$ also is provided with an idler set and two rings, but is of the type shown in Fig. 4 with the idler pinion set adjacent the center.

The element $4^e$ is similar to the element $4^c$.

The element $4^f$ is a double terminal element, being the last element of the first torsion lever and the first element of the second torsion lever. This element comprises two gear rings 6 connected, preferably directly, so that one drives the other in the same direction.

The element $4^g$ is similar to the element $4^c$, as is also the element $4^i$, which is secured to the load shaft 2.

The element $4^h$ is similar to the element $4^d$ and the element $4^j$ is similar to the element $4^a$ having one gear ring meshing with the idler set of the element $4^i$.

An anti-friction thrust bearing 7 is interposed between this element and the end of the housing 3 to take care of the axial thrust.

The elements $4^b$, $4^c$, $4^d$, $4^e$, $4^g$, $4^h$ and $4^j$ are adapted to be immobilized (by means hereinafter described) to provide fulcrums for the torsion levers. In the two-lever system shown, one element of each lever will be immobilized at the same time. It should here be noted that the element $4^j$ is located outside the element $4^i$, which is connected to the load shaft, and is therefore outside the flow of power. Thus, if this element be immobilized to provide a fulcrum, both the power and load are on the same side of the fulcrum and the direction of rotation of the element $4^i$ is the reverse of that it was when the fulcrum is positioned between the power and load. With the arrangement of elements shown the following gear ratios are possible:

When $4^b$ is the fulcrum element it is found that the element $4^f$ is rotating at four times motor-speed, when $4^c$ is the fulcrum element only at 1.5 times motor-speed, when $4^d$ is the fulcrum element only at .67 times motor-speed, and when $4^e$ is the fulcrum element, only at .25 motor-speed, of course always in opposite direction to the motor.

When $4^g$ is the fulcrum element, the load element $4^i$ is rotating at twice the speed of the element $4^f$, but in an opposite direction to the latter; when $4^h$ is the fulcrum element, $4^i$ is rotating at one-half the speed of the element $4^f$ and in an opposite direction to the latter, and when $4^j$ is the fulcrum element, $4^i$ is rotating at one-quarter of the element $4^a$'s speed and in the same direction, both elements being on the same side of the fulcrum element $4^j$.

Combining these together and omitting the highest as being too remote from the other speed-ratios, we have the following speed-ratios between the load and power shafts in forward drive:

$$\frac{3}{1}, \frac{2}{1}, \frac{4}{3}, \frac{3}{4}, \frac{1}{2}, \frac{1}{3}, \frac{1}{8};$$

and for reverse drive—

$$\frac{-1}{16}, \frac{-1}{6}, \frac{-3}{8};$$

omitting here also the highest ratio as being impractical.

The flow of power, supposing the elements $4^e$ and $4^h$ provide the fulcrums, is as follows: The flywheel rotates in the direction shown causing the idlers of the element $4^b$ to rotate in the direction shown. The idlers being in mesh on the other side of their axes with a ring of the $4^c$ cause the element $4^b$ to revolve at a lesser speed than the flywheel, but in the same direction. Now a ring of the element $4^b$ meshes with the idlers of the element $4^c$ and cause the latter to revolve in the direction shown. These idlers being in mesh with a ring of the element $4^b$ causes the element $4^c$ to revolve in the direction shown, that is in the same direction as the element $4^b$ but at a lesser velocity. Now a ring of the element $4^c$ meshes with the idlers of the element $4^d$ and causes them to revolve in the direction shown. But these idlers mesh with a ring of the element $4^e$, which is immobilized, thus causing the element $4^d$ to rotate in the same direction but half as fast as the element $4^c$. The difference in velocity of any two meshing wheels being constant, we have the element $4^b$ rotating at three-quarter the fly-wheel-velocity, the element $4^c$ at half that velocity, the element $4^d$ at one-quarter of that velocity, and the element $4^e$ at no velocity at all. But the idler of the element $4^e$ meshes on one side with a ring of the element $4^d$, and on the other with a ring of the element $4^f$, thus causing the latter to revolve in the opposite direction to but at the same speed as the element $4^d$. Now the element $4^f$ meshes with the idlers of the element $4^g$ and causes it to rotate in the direction shown and the idlers of the element $4^g$ mesh with the ring of the element $4^h$ which is immobilized, causing therefore the element $4^g$ to rotate in the same direction and half as fast as the element $4^f$ and in the same way the element $4^i$ in the opposite direction and at the same speed as the element $4^g$. The load element $4^i$ is thus rotating and driving the load shaft at one-eighth of the speed of the flywheel and in the same direction, with the element $4^j$ idling at twice the speed of the element $4^i$.

In Fig. 5 I show diagrammatically two torsion levers of the same type as those of Fig. 1, that is the idler pinion sets are journalled on radial axes and the gear rings and pinions are bevelled accordingly. The torsion elements 70, 71, 72, 73, 74 and 75 of the first torsion lever are loose on the drive shaft or on an intermediate shaft 63, but any one of the first three may be clutched to the drive shaft by a clutch such as shown in Figs. 18 and 19 of the drawings.

The elements 72, 73, 74 and 75 may be clutched to the intermediate shaft 63. The second lever comprises the elements 76, 77, 78, 79 and 80. Of these the elements 76, 77, and 78 may be clutched to the intermediate shaft and 78, 79 and 80 to the load shaft.

Every element is provided with a drum 8 for engagement with clutch bands whereby it may be immobilized. If the element 70 be clutched to the power shaft, the elements 75 and 76 to the intermediate shaft and the element 79 to the load shaft, twelve speed ratios, including forward and reverse, may be obtained by immobilizing the different elements in different combinations.

By clutching different elements to the shafts in different combinations no less than 1296 speed ratios are possible including forward and reverse. An element clutched to a shaft to serve as a terminal element may not be immobilized to serve as a fulcrum element, but if the elements 72 and 78 be clutched to the power and load shafts respectively, as well as to the intermediate shaft, direct drive from the power shaft to the load shaft is obtained.

The shaft clutch employed is illustrated in Figs. 18 and 19. The shaft is hollow and in it slides the shifter rod 64. The shaft is slotted and through the slot extends a pin 65 which is connected to the shaft and to a shifter collar 66 by means of which the shifter rod may be actuated. Between the shaft and each element 4 to be clutched are positioned a plurality of rollers 67 positioned by a cage 68. The shaft is transversely slotted and in the slot are positioned the jamming members 69. The inner sides of these members are preferably longitudinally bevelled each way from the middle and are engageable by a bevelled enlargement 81 on the shaft to press outwardly the members 69 to jam the rollers against the element running on them to clutch the element to the shaft. Normally the jamming members are retracted by a spring coil 82 which embraces the members and is received in a peripheral groove therein.

It will be evident that numerous modifications of the torsion elements and of the arrangement of the torsion elements are possible to obtain different desired results, that my invention may be embodied in one torsion lever only or in a torsion lever system such as illustrated in Fig. 1, and that many variations in the construction of the torsion elements and torsion levers are possible. For instance, instead of having the idler sets of the "normal" type, that is, having their axes normal to the axis of the element, as shown in Figs. 1 and 5, they may be parallel thereto, or at any angle in between. See Figs. 6, 7, 20 and 21. Instead of employing elements with "single" idler sets, (see Fig. 1) I may employ a "multiple" set element or elements, that is, elements having at least two sets meshing with the gear rings of other elements. See Fig. 23. Instead of having elements with "simple" sets of idlers, that is, idlers having one ring of teeth, (see Fig. 1) it is possible to have elements with "compound" sets, that is, idlers with more than one ring of teeth. See Figs. 22 and 23. Instead of what I term "straight" sets, that is, with the idler gear sets meshing with only two elements, as in Fig. 1, I may use what I term a "complex" set, that is, a set meshing with more than two elements. See Fig. 23. Instead of having two sided sets of idlers, that is, idlers meshing on opposite sides with other elements, it is possible to have them "one-sided", that is, meshing with the gear rings of other elements on one side only. See Fig. 22. Instead of arranging the elements to form what I term "long" torsion levers, that is, levers in which the power may flow through any number of units simultaneously, as in Fig. 1, I may arrange them to form what I term "short" levers, that is, arrangements in which one unit only carriers all the power at any given time. See Fig. 22.

In general it must be understood that by the term element is meant a part provided with any number of gear rings and/or idler sets, at least one of either, of common axis and invariable relative position.

By an "idler set" is meant one or more identical idlers of common summit, their axes having an invariable relative position on the same conical surface, that is a surface generated by any straight line rotating about another and both being in the same plane.

By an "idler" is meant one or more co-axial gear rings of common summit and invariable relative position.

Reverting to Figs. 6 and 7 I show therein two "short" levers using idler elements of the "parallel" type, the first lever "complex" with an idler carrying element having a "single", "one-sided", "compound" idler set, the second a "straight" lever having an idler carrying element with "multiple", "two-sides", "simple" idler sets. In this form 57 is a terminal element secured to the shaft 1 and carrying an internal gear ring 6. The element 58 carries a "single", "compound", "complex" and "one-sided" idler set composed of a plurality of different gear rings. The corresponding rings of the idlers of each set mesh with one of the elements 59 each of which is provided with a gear ring 6.

Each of the elements 59 is provided with a drum 8 for engagement with a clutch band whereby it may be immobilized as desired. In this form the element 58 is the terminal element of the torsion lever formed by the elements 57, 58 and the elements 59. The element 58 is directly connected to the terminal element 60 which carries "multiple", "simple", "straight", "two-sided" idler sets 5, which mesh respectively with corresponding gear rings 6 of the element 61 which is a terminal element and is secured to the shaft 2. The idler sets of the element 60 also mesh with the rings 6 of a plurality of elements 62, also provided with drums 8 for engagement with clutch bands whereby the element may be immobilized.

The elements 60, 61 and the elements 62 thus form a second torsion lever. It is evident that by immobilizing one element of each lever in different combinations that a great variety of gear ratios are obtainable.

For example, the gear-ratios of the left hand lever are approximately—

$$\frac{1}{7}, \frac{2}{9}, \frac{1}{3}$$

and of the right hand lever approximately—

$$\frac{3}{11}, \frac{3}{10}, \frac{1}{3}, \frac{3}{8}$$

giving substantially the twelve following remarkably uniformly distributed and closely grouped gear-ratios—

$$\frac{1}{26}, \frac{1}{23}, \frac{1}{21}, \frac{1}{19}, \frac{1}{17}, \frac{1}{15}, \frac{1}{13\frac{1}{2}}, \frac{1}{12}, \frac{1}{11}, \frac{1}{10}, \frac{1}{9}, \frac{1}{8}$$

When the second element 59 and the third element 62 are immobilized the parts rotate in the direction indicated by arrow. With this form of my invention great speed reduction is possible which makes it well adapted for use with electric motors or steam turbines.

Referring again to Figs. 20 and 21 of the drawings, which show a portion of a lever of the "long" type, 83 is a torsion element carrying a gear ring 6. This gear ring meshes with idler sets 5 carried by the element 84 on axes parallel to the shaft. The body of this element is shown offset longitudinally of the shaft relative to the element 83. The idler sets of the element 84 mesh also with the gear ring of the element 85. The element 85 carries idler sets 5 meshing with a gear ring 6 of the element 84 and with any other element outside (not shown). The element 85 is also provided with a gear ring 6 adapted to mesh with the idler set of any element (not shown) which may be positioned outside the same. The body of this element 85 is offset axially of the shaft to bring its gear rings into alinement with the idler set of the element 84. The idler sets in this form are of the "parallel", "simple", "two-sided", "single" type and all the elements are concentrically positioned.

Referring again to Fig. 22, the element 86 carries a gear ring 6 meshing with one of the parts of a compound idler set 5 on the element 87. The idlers are journalled on radial axes and engage on one side only with the gear rings of the elements 88. This arrangement forms what I have termed a "short" torsion lever. The idler set is of the "normal", "compound", "one-sided", "complex", "single" types.

Referring again to Fig. 23 of the drawings, I show a portion of a "long" lever comprising six elements 89–94. The element 89 is shown with gear rings 6 at opposite sides to mesh with idlers of adjacent elements. It also carries a "single", "compound" idler set 5 on "normal" axes. The next element 90 carries multiple idler sets, the inner "compound" and the outer "simple" and two gear rings 6 at opposite sides. The element 91 is provided with one "single", "compound" and "complex" idler set and three gear rings 6 to mesh with the idlers of adjacent elements. The element 92 is provided with one "single", "compound", "straight", "two-sided" idler sets, and two gear rings to mesh with idlers of adjacent elements. The element 93 carries a gear ring 6 meshing with the "complex" idler set of the element 91. The element 94 carries a gear ring meshing with one of the multiple idler sets of the element 90. In this form, when the element 94 is immobilized, the parts rotate in the direction indicated by arrows.

The various forms described possess different characteristics which need not be specifically referred to, suffice it to say that the form shown in Fig. 1 is possibly best adapted for use in automatic vehicles as the construction is simple, the elements of small diameter, inexpensive and of standard forms. Further axial thrust is exerted by the elements which enables axial adjustment for wear to be exerted while the form shown in Figs. 6 and 7 possesses advantages which make it the preferred modification of the embodiment illustrated in Fig. 1.

The clutch mechanism for immobilizing the torsion elements is shown in Figs. 1 and 2 of the drawings.

Each torsion element which is to be immobilized has its body formed with a drum 8. For each clutch drum I provide two clutch bands 9 and 10 each secured at one end to a flange 11 carried by one of the cross axles 12 of the frame or housing 3. The other ends of these bands are connected to a rock arm 13 at opposite sides of an axle 12 on which the arm is rockable. Thus by rocking the arm the clutch bands are tightened on the drum. By this means any one torsion element may be gradually and smoothly immobilized and another as gradually and smoothly released, thus enabling the gear ratios to be changed substantially imperceptibly.

While any means may be used to operate the rock arms 13 I prefer to use power-operated means, using, for instance, pressure oil as in the mechanism shown, which comprises a plurality of cylinders 14 one for each of the clutch bands. Each cylinder is fitted with a piston 15 connected by a connecting rod 16 with the corresponding rock arm 12. As the torsion elements $4^g$ and $4^h$, when immobilized, have a tendency to turn in the reverse direction to the elements $4^b$, $4^c$, $4^d$ and $4^e$, when immobilized, the clutch band operating mechanism of these bands is oppositely positioned relative to the mechanism for operating the other bands.

The admission and exhaust of fluid to actuate the pistons is effected by the following means: In the housing are formed a plurality of distributing channels 17 each communicating with one of the cylinders 14. To each channel 17 leads a collecting channel 18 leading from a piston valve cylinder 19. As there are provided seven forward speed ratios and three reverse speed ratios and, as the lowest reverse and lowest forward speeds are obtained at one given position of the piston valve, there are nine positions from each of which, at least, two collecting channels lead to two different distributing channels, since for each given speed ratio two clutches must be operated to provide two fulcrums. In this cylinder a hollow piston valve 20 is slidable in the valve cylinder and has a port formed therein adapted to form a communication between the interior of the hollow piston and the nine different combinations of the collecting channels.

In position 7 from the left in Fig. 15 the piston valve brings its port into communication with collecting channels leading to the distributing channels of the torsion elements 4ª, 4ʰ, and 4ʲ. But the channels leading to the distributing channels of the elements 4ʰ, and 4ʲ are intercepted by the rotary reverse valve 21 which is provided with two oblique passages 22, so that when the valve is in the position shown in Fig 16 the distributing passage for the element 4ʲ is shut off and that to the element 4ʰ is open and lowest forward ratio is obtained and when it is turned through an angle of 90° the situation is reversed and, as the element 4ʲ is then immobilized, lowest reverse speed ratio is obtained.

No. 7 is thus the initial position of the piston 20. In Fig. 15 is shown diagrammatically the different connections made by the piston valve in each of its nine positions.

In this diagram the vertical lines indicate the nine positions of the piston valve 20 and the horizontal lines the collecting and distributing channels leading to the elements 4ᵇ, 4ᶜ, 4ᵈ, 4ᵉ, 4ᶠ, 4ʰ and 4ʲ. The circles at the intersections of the lines indicate that at the positions shown the channels from the valve cylinder to the clutch cylinders of the different elements are open.

Thus, starting from position 7 with the reverse valve in the forward position, the movement of the piston valve to the left gives the seven forward speed ratios hereinbefore set forth; and, starting from the same position, the movement of the piston valve to the right with the reverse valve in the reverse position, gives the three reverse speed ratios.

The operating fluid is supplied under pressure and through the connection 27. When the piston is in any one of the nine positions referred to fluid is forced to each of the cylinders 14 of the clutch operating mechanism of the corresponding torsion elements, passing through the inlet 28 and forcing back the valve 29. This inlet valve comprises a hollow metal cylinder closed at its upper end, which loosely fits the inlet 28 and the outlet 30, which is in alinement with the inlet 28. A rod 31 has a spider 32 secured thereto on which the cylindrical valve 29 is slidable and this rod is supported by the screw plug 32ª. A coil spring 33 engages the spider and the upper end of the valve shell and normally retains the valve raised and the outlet open. When liquid is forced through the inlet 28 the valve is forced down and the outlet closed save for a small leakage due to its loose fit. As soon as the feeding of oil to the inlet 28 ceases, the spring 33 raises the valve and opens the outlet to immediately vent the pressure behind the piston 15, thus releasing the clutch.

The return of the piston to release the clutch is effected by a bent spring 34, which is coiled about the pivotal connection of the rock arm 12 with the connecting rod 16 and has its arms engaged with these parts.

The speed of operation and power of a clutch may be regulated once and for all by suitably proportioning the piston, the leverage of the arms, the size of the channels, the pressure of fluid or any other variable means.

From the outlets, the oil may be led back to the pressure pump (not shown) or otherwise disposed of.

While it is obvious that the piston valve 20 could be moved by hand to change the gears, it is preferable to provide means whereby the gear-ratios may be automatically shifted by a speed-responsive device tending to keep the speed of the power shaft substantially constant regardless of variation in the speed of the load shaft.

The speed-responsive device may preferably use centrifugal force and may be operated from either shaft, but preferably from the load shaft as illustrated in Figs. 1, 2, 8—14 and 24 of the drawings.

Briefly it comprises a sectional helix A with its axis positioned parallel to the piston valve 20, which valve has a radial upstanding pin 35 extending to the helix. The sections of the helix are slidable radially of the axis of the helix to project at one side or the other of the helix. When projected at one side they form a right-handed helix and serve to worm the valve pin in one direction and when projected at the opposite side they form a left handed helix and serve to worm the pin in the opposite direction.

Provisions are made to move the pin in one direction from an initial position to provide forward gear ratios and in the other direction from said position to obtain reverse gear-ratios.

The different sections or cams 36 of the speed responsive device A are actuated by centrifugal control devices 37 operating against the tension of springs 38. The strength of the springs in the different sections progressively increases each way from the initial position so that as the forward speed of the device A increases the cams are progressively projected to form a left hand helix and the pin correspondingly moved and, as the speed decreases the cams are progressively retracted to form a right hand helix and the pin is shifted back, and as reverse speed increases the reverse cams are progressively projected to shift the pin correspondingly and retracted to shift it back as the speed falls.

I have found that, if the strength of the springs of the different control units is such that the latter will function at speeds of the speed responsive device proportional to the following numbers beginning at the left in Fig. 1, namely—24, 16, 9.8, 6, 4, 2, 1, 2.45; and the gear ratios for forward speed being as hereinbefore set forth, that the speed of the power shaft can be kept between substantially 81% and 123% of the optimum speed for about 92%–93% of the total range of speeds of the load shaft.

The specific construction of the speed responsive device A may be as follows: On the shaft 39 are secured the disks 46 in which are supported the longitudinal rods 47. Between these end disks are positioned eight control units separated from one another and the end disks by disks 48. The disks 48 correspond in position to the nine positions of the piston valve 20.

Each control unit comprises two centrifugal control segments 37 and a cam member 36. The segments 37 of each unit are symmetrical and are oppositely pivoted on the respective rods 47. A connecting rod 49 has its ends pivotally connected to the two segments, as shown, so that their movements are simultaneous. The reaction of their centrifugal force on the shaft is thus balanced and the influence of gravity on their position eliminated. They will thus operate accurately as centrifugal masses at low speeds and without vibration at high speeds. Their inward and outward movement is limited by the shaft 39 engaging the cam member in a manner hereinafter described and in the inward position they are normally retained by the bent spring 38 which passes round one of the rods 47 and has its ends respectively engaged with the shaft 39 and the pin 51 projecting from one of the segments. These springs should be given sufficient initial tension to automatically take care of the increased centrifugal force, when the segments are thrown out, due to their greater radius of rotation though rotating at the same speed.

It will be noticed that the face of each one of a pair of segments which is adjacent a disk 48 is recessed to receive the spring and connecting rod to prevent the latter contacting with the disk and the noses of adjacent cams with the segment. The adjacent faces of a pair of segments are bevelled, as shown, and between them slides a cam 36 provided with a slot 50 through which the shaft 39 passes. When the cam is in one position it will project at one side of the device and when in the other position at the opposite.

The segments operate the cam through the medium of a pin 51, which passes through a hole in the segment directly actuated by the spring 38 and serves also as an abutment for the spring.

The movements of the cam being restricted, so also are the movements of the segments which at no time project beyond the surface of an imaginary cylinder co-axial with the disks 48 and of the same diameter. Each end of each cam (with an exception hereinafter referred to) is provided with a nose 52 which extends further from the central line of the cam than the tail 53, the noses forming the leading parts of the cams when operating whatever may be the position of the cams. The sides of the cam forming the ends of the noses and tails are bevelled, as shown, on planes at right angles to the axis of the device, the tail plane 54 of one cam lying in substantially the same imaginary plane as the nose plane 55 of the next cam.

The disks 48 are formed with slots 56 through which the noses of the cams extend.

Referring to Fig. 1, the valve pin 35 is shown in the initial position. All the cams 36 to the left of this position control the valve pin to give forward gear ratios. The two control units to the right of this position control reverse gear ratios, and therefore the direction of the cams must be reversed in order to keep the noses leading the way as the direction of rotation of the device A is reversed when the direction of rotation of the load shaft is reversed. The required position is obtained by, as it were, rotating the reverse control units from the position they would have as forward control units through an angle of 180° about an axis a—a normal to the shaft 39 passing through the axes of both of the rods 48. See Fig. 25.

The exceptional cam hereinbefore referred to is the first reverse cam which, at one end (that which worms the valve pin to the right) has its nose removed. Further the spring 38 which holds the cam in its retracted position is the weakest of the series so that the cam will be the first to be moved by its centrifugal control segments to project its noseless end. Assuming the valve pin 35 to be in the initial position shown and the reverse valve 21 in position for forward speeds, when the engine is started, the speed responsive device A begins to rotate.

As speed increases the noseless cam will be thrown out first, but nothing will happen until the first cam to the left is thrown out, which, by engagement with the valve pin, will worm the pin to the left leaving it opposite the next disk 48. If the speed further increases the next cam is thrown out and the pin further wormed to the left and so on. If the speed decreases the cam which last moved the pin is moved by its spring to project its reverse end, which then, having its forwardly projecting nose travelling in a position to engage the pin, does so engage the pin and moves it back to the right. Thus the valve pin is moved back and forth as the speed of the device varies to give the best gear ratio for any given speed of the load shaft.

If the parts are in the initial position and the reverse valve 21 is in position for reverse speeds, when the engine is started the speed responsive device beings to rotate in the reverse direction. As soon as the speed is sufficient the first reverse cam 36 is moved to project its noseless end, but nothing further happens until the speed is sufficient to throw out the first forward cam, the nose of which then comes into a position to engage the valve pin so that the cam end pushes the pin to the right and into the path of the projected noseless end of the first cam which has previously been projected. The first reverse cam worms the pin to a position for engagement with the second reverse cam as soon as that is projected.

The shift back to the left takes place in the same manner as the shift back to the right from forward speed positions.

In Fig. 13 I illustrate diagrammatically the mode of operation of the first forward and first reverse cams when starting in forward drive, accelerating in forward drive, slowing down in forward drive, stopping in forward drive, starting in reverse, accelerating in reverse, slowing down in reverse and stopping in reverse. The central broken line represents the initial position of the valve pin, the left hand broken line the second position in forward drive and the right hand broken line, the second position in reverse drive. The portions of the cams protruding across the dotted line represent the noses, and the inclination of the cams indicate formation of a right hand helix when a unit is retracted and a left hand helix when it is thrown out; in forward as well as in reverse.

In position 1 the speed responsive device A is assumed to be stationary and all cams are retracted. In position 2 the device is moving slowly, but no other change takes place. In position 3 the device is moving faster and the first reverse speed cam is projected, but again nothing further happens. In position 4 the speed is still greater and the first forward speed cam is thrown out and its nose engages the pin, which is then pushed to the second position. In position 5 the speed has been decreased and the first forward speed cam is retracted which extends its rear end, the nose of which engages the pin and the cam shifts it back to the initial position. In position 6 the speed is still less and the first reverse speed cam is retracted. In position 7 the device is stopped and both cams are retracted. In position 8 the device is commencing to rotate in the reverse direction, but no other change has taken place. In position 9 the speed of the device has become sufficiently great to throw out the first reverse cam. In position 10 the speed has increased sufficiently to throw out the first forward speed cam, the nose of which is in position to engage the pin and, as the direction of movement of the cam is now reversed, it pushes the pin into the path of the noseless projected end of the first reverse speed cam. In position 11 the device is slowing down and the first forward speed cam has retracted. In position 12 the device has slowed down sufficiently for the first reverse speed cam to retract which brings the nose of its rear end into a position to engage the pin so that the cam pushes back the pin to the initial position. In position 13 the speed responsive device is again stationary and both cams illustrated are retracted as well, of course, as all the others.

While it is obvious that the speed responsive mechanism can be operated by means of an invariable drive from the load shaft thereby keeping the speed of the motor substantially constant irrespectively of the speed of the load shaft, it is preferable to use means which modify the effect of the speed responsive device in such a way, as will control substantially the speed of the motor disregarding the speed of the load shaft. This speed-controlling mechanism may consist of a variable drive between the load shaft and the speed responsive mechanism such as illustrated in Fig. 1, modifying the effect of the load shaft speed on the speed responsive mechanism.

The shaft 39 of the speed responsive mechanism is journalled in the housing 3 and has secured thereto a friction disc 40. A similar friction disc 41 is secured to the load shaft 2. Parallel to the faces of the discs is mounted a slidable shaft 42 to which are secured friction discs 43 engaging the faces of the discs 40 and 41. A variable speed drive is thus provided between shaft 2 and the speed responsive device.

It follows that, provided the speed responsive mechanism keeps the speed of the motor substantially constant for the same position of the above variable drive, one has the following: (1) With the slidable shaft at a given position, the ratio between the speed of the load shaft and the speed responsive mechanism is fixed, and the motor speed is kept substantially constant at a certain value. (2) With the slidable shaft at any other position the above fixed ratio between the speed of the load shaft and the speed responsive mechanism is changed being equal to the former ratio multiplied by a resultant factor. The motor speed is again kept substantially constant and equal to the above value multipled by the said factor, as for every position of the valve-pin the speed of the load shaft and consequently of the motor shaft, must be equal to their former speed multiplied by that factor in order to keep the speed responsive mechanism at the proper speed to maintain the valve-pin in that particular position. This mechanism therefore controls the speed of the motor irrespectively of the speed of the load shaft and subsequently I will call it the "speed-control".

The speed at which the efficiency of the motor is highest at given conditions I will call "optimum" speed. It is known that the optimum speed varies according to the conditions affecting the operation of the engine, and which need not be specified. The actual power generated for instance is one of these. I term above conditions "variables".

While the speed control obviously may be operated automatically from variables by adequate means or by hand, it is advisable to have both manual and automatic operation.

For instance the manual control may serve as a brake, by smoothly increasing the braking power of the motor, throwing it gradually into lower gears. The automatic control may be responsive to some function of the power. The position of the fuel control lever of an engine is a function of the power for a given motor speed. The arrangement illustrated shows a possible realization of this double control.

The shaft 42 is shown as operatively connected with the pedal B, the throttle control pedal of the engine. A second pedal C is provided, which is also connected with the shaft 42. For convenience both pedals are shown as connected to a lever 44 connected intermediate of its ends to the shifter rod 45 engaging the grooved collar 92 on the shaft 42. The pedal B is adapted to be connected to the lever 44 in any one of several positions 90 whereby an adjustment is provided to take care of other variables than the power output of the engine, automatic change of the positions 90 being possibly operated by the rod 89. By operating the pedal C the relative speed of the speed responsive device may be varied to shift to lower gears when it is desired to use the braking power of the engine.

It will be seen, then, that if the speed of the power shaft needs to be varied on account of variations of variables, the speed-control between the load shaft and the speed responsive device is moved to vary the relative speed of the two and the gear ratios are shifted to bring into action that gear ratio adapted to allow the power shaft to run at its optimum speed.

If no change is made in the "variables", and the speed of the load shaft varies, the gear ratio will automatically be changed and the relative speed of the two shafts adjusted as may be necessary to keep the drive shaft running at optimum speed.

From the above it will be seen that I have evolved a method of and apparatus for changing gear ratios which will satisfactorily attain the objects of my invention as set out in the preamble to this specification.

In this transmission there is no sliding of gears into and out of mesh.

A sufficient range of gear ratios is provided to enable the motor to be driven substantially at its optimum speed at all times. Changing from one gear ratio to another may be effected in such a manner that there is no interruption to the flow of power.

The changing of gears may be automatically made as necessary. Many other advantages also flow from the invention which it is unnecessary to set forth.

What I claim as my invention is:

1. In change speed gearing a torsional lever comprising a drive shaft and load shaft co-axially positioned; at least four torsion elements, namely a power element deriving power from the power shaft, a load element transmitting power to the load shaft, and two elements normally free to rotate co-axially with the shafts, any one of the torsion elements with two others forming a torsional unit, one element of each unit carrying an idler pinion and each of the other two, gear rings with which the pinion meshes, at least one idler axis moving outside a plane defined by two near positions of any other moving idler axis; and means for providing a fulcrum.

2. In change speed gearing a torsional lever comprising a power shaft and a load shaft co-axially positioned; at least four torsion elements, namely a power element deriving power from the power shaft, a load element transmitting power to the load shaft, and two elements normally free to rotate co-axially with the shafts, any one of the torsional elements with two others forming a torsional unit, and gearing comprising gear rings and idlers keeping the relative speed of all elements with reference to any one in constant ratio, at least one idler axis moving outside a plane defined by two near positions of any other moving idler axis; and means for immobilizing any one of the free elements.

3. In change speed gearing a torsional lever comprising a drive shaft and load shaft co-axially positioned; at least four torsion elements, namely a power element deriving power from the power shaft, a load element transmitting power to the load shaft, and two elements normally free to rotate co-axially with the shafts, any one of the torsion elements with two others forming a torsional unit, one element of each unit carrying an idler pinion and each of the other two, gear rings with which the pinion meshes; means for providing a fulcrum; and means for clutching different torsion elements to the power shaft or load shaft.

4. In change speed gearing a torsional lever comprising a drive shaft and load shaft co-axially positioned; at least four torsion elements, namely a power element deriving power from the power shaft, a load element transmitting power to the load shaft, and two elements normally free to rotate co-axially with the shafts, any one of the torsion elements with two others forming a torsional unit, one element of each unit carrying an idler pinion and each of the other two, gear rings with which the pinion meshes; and means for providing a fulcrum in different relative positions, the torsion elements being positioned so that the fulcrum may be positioned between or on the same side of the terminal elements to provide forward or reverse motion.

5. In change speed gearing a torsional lever comprising a drive shaft and load shaft co-axially positioned; at least four torsion elements, namely a power element deriving power from the power shaft, a load element transmitting power to the load shaft, and two elements normally free to rotate co-axially with the shafts, any one of the torsion elements with two others forming a torsional unit, one element of each unit carrying an idler pinion and each of the other two, gear rings with which the pinion meshes; and means for immobilizing any one of the free elements to constitute it a fulcrum element, the immobilizing means comprising means for progressively applying, or quickly relieving, resistance to the rotation of the free elements whereby one may be released quickly while another is immobilized gradually and smoothly to move the fulcrum from one position to another.

6. In change speed gearing a torsional lever comprising a power shaft and a load shaft co-axially positioned; at least four torsion elements, namely a power element deriving power from the power shaft, a load element transmitting power to the load shaft, and two elements normally free to rotate co-axially with the shafts, and gearing comprising gear rings and idlers keeping the relative speed of all elements with reference to any one in constant ratio, and immobilizing means for progressively applying, or quickly relieving, resistance to the rotation of the free elements, whereby one may be quickly released while another is immobilized gradually and smoothly to move the fulcrum from one position to another.

7. Change speed gearing comprising power and load shafts co-axially positioned; two torsional levers in series connecting the shafts, one comprising at least three torsional elements and the other at least four, including power and load elements, and gearing comprising gear rings and idlers keeping the relative speed of all elements of a lever with reference to any one in constant ratio, at least one element of one lever being free to rotate around its axis; and means to immobilize said free element, the load element of the first torsional lever being fixedly connected to the power element of the second torsional lever in the flow of power, so that they rotate together in the same direction and at the same speed.

8. Change speed gearing comprising a power shaft and load shaft co-axially positioned; two torsional levers in series connecting the shafts, each comprising a power element, a load element and at least two elements normally free to rotate co-axially with the shafts, any one of the torsion elements with two others forming a torsional unit, one element of each unit carrying an idler pinion and each of the other two gear rings with which the pinion meshes, and means for immobilizing any one of the free elements to constitute it a fulcrum element, the load element of the first torsional lever in the series being connected to the power element of the second torsional lever in the flow of power so that they rotate together in the same direction and at the same speed, the power element of the first torsional lever being connected to the power shaft and the load element of the second lever to the load shaft.

9. Change speed gearing comprising a power shaft and load shaft co-axially positioned; two torsional levers in series connecting the shafts each comprising at least four torsion elements, namely a power element, a load element, and at least two elements free to rotate co-axially with the shafts, and gearing comprising gear rings and idlers keeping the relative speed of all elements, with reference to any one in constant ratio, the load element of the first torsional lever in the series being connected to the power element of the second torsional lever in the flow of power so that they rotate together in the same direction and at the same speed, the power element of the first torsional lever being connected to the power shaft and the load element of the second lever to the load shaft.

10. Change speed gearing comprising a power shaft and load shaft co-axially positioned; two torsional levers in series connecting the shafts each comprising at least four torsion elements, namely a power element, a load element, and at least two elements free to rotate co-axially with the shafts, and gearing comprising gear rings and idlers keeping the relative speed of all elements, with reference to any one in constant ratio, the load element of the first torsional lever in the series being permanently connected to the power element of the second torsional lever in the flow of power so that they rotate together in the same direction and at the same speed, the power element of the first torsional lever being connected to the power shaft and the load element of the second lever to the load shaft.

11. Change speed gearing comprising a power shaft and load shaft co-axially positioned; two torsional levers in series connecting the shafts, each comprising a power element, a load element and at least two elements normally free to rotate co-axially with the shafts, any one of the torsion elements with two others forming a torsional unit, one element of each unit carrying an idler pinion and each of the other two gear rings with which the pinion meshes, and means for immobilizing any one of the free elements to constitute it a fulcrum element, the load element of the first torsional lever in the series being connected to the power element of the second torsional lever in the flow of power so that they rotate together in the same direction and at the same speed, the power element of the first torsional lever being connected to the power shaft and the load element of the second lever to the load shaft, the torsion elements of one of the levers being positioned so that the fulcrum may be positioned at will between or on the same side of the terminal elements to provide forward or reverse motion.

12. Change speed gearing comprising a power shaft and load shaft co-axially positioned; two torsional levers in series connecting the shafts each comprising at least four torsion elements, namely a power element, a load element, and at least two elements free to rotate co-axially with the shafts, and gearing comprising gear rings and idlers keeping the relative speed of all elements, with reference to any one in constant ratio, the load element of the first torsional lever in the series being connected to the power element of the second torsional lever in the flow of power so that they rotate together in the same direction and at the same speed, the power element of the first torsional lever being connected to the power shaft and the load element of the second lever to the load shaft, the torsion elements of one of the levers being positioned so that the fulcrum may be positioned at will between or on the same side of the terminal elements to provide forward or reverse motion.

13. In change speed gearing a torsional lever as set forth in claim 2 in which at least one element has an idler set in which the axes of the idlers are positioned to extend in a direction other than normal to the axes of the shafts.

14. In change speed gearing a torsional lever as set forth in claim 2 in which at least one element has an idler set in which the axes of the idlers are substantially parallel to the axis of the element.

15. In change speed gearing a torsional lever as set forth in claim 2 in which at least one element has a plurality of idler sets meshing each with gear rings of other elements.

16. In change speed gearing a torsional lever as set forth in claim 2 in which at least one element has an idler set in which the idlers mesh at one side only with the gear rings of other elements.

17. In change speed gearing a torsional lever as set forth in claim 2 in which only one element carries a single set of substantially parallel idlers, each one comprising a plurality of gear rings, and meshing on the same side with a plurality of other elements.

18. In change speed gearing a torsional lever as set forth in claim 2 in which only one element carries a plurality of substantially parallel idlers sets, each idler having a single gear ring meshing with a single element on each side.

19. A transmission mechanism as set forth in claim 2 in which one unit includes one free element only.

20. A transmission mechanism as set forth in claim 2 in which one unit includes two free elements only.

21. A transmission mechanism as set forth in claim 2 comprising at least five elements, in which at least one unit comprises three free elements.

22. A transmission mechanism as set forth in claim 2 in which every unit includes one free element only.

23. A transmission mechanism as set forth in claim 2 in which every unit but one includes only two free elements, and one unit includes at least one free element.

24. A transmission mechanism as set forth in claim 2 comprising at least six elements, in which all but two units comprise three free elements each, and two units include at least one free element each.

25. A transmission mechanism as set forth in claim 2 in which one element includes external gearing only.

26. A transmission mechanism as set forth in claim 2 in which one unit comprises external gearing only.

27. A transmission mechanism as set forth in claim 2 in which every unit comprises external gearing only.

28. A transmission mechanism as set forth in claim 2 in which one unit includes one internal gear only.

29. A transmission mechanism as set forth in claim 2 in which every unit includes one internal gear only.

30. A transmission mechanism as set forth in claim 2 in which one unit includes two internal gears.

31. A transmission mechanism as set forth in claim 2 in which every unit includes two internal gears.

32. In transmission mechanism the combination of a power shaft; a load shaft; change speed gearing between the two; a mechanism involving a primary flow of power to effect the movements of the change speed gearing to change gear ratios; a further mechanism involving a secondary flow of power distinct from the former to control the movements of the first mentioned mechanism; and means involving a tertiary flow of power distinct from the two formers for controlling the last mentioned mechanism.

33. In transmission mechanism the combination of a power shaft; a load shaft; change speed gearing between the two; a mechanism involving a primary flow of power to effect the movements of the change speed gearing to change gear ratios; a further mechanism involving a secondary flow of power distinct from the former to control the movements of the first mentioned mechanism; and speed responsive means involving a tertiary flow of power distinct from the two formers for controlling the last mentioned mechanism.

34. In transmission mechanism the combination of a power shaft; a load shaft; and change speed gearing between the two providing a plurality of stepwise gear changes and power mechanism adapted to rapidly disengage one gear ratio while gradually engaging another, thus momentarily overlapping the drive through the two different gears and ensuring an uninterrupted flow of power.

35. In transmission mechanism the combination of a power shaft; a load shaft; change speed gearing between the two providing a plurality of stepwise gear changes; power mechanism adapted to rapidly disengage one gear ratio while gradually engaging another; and speed responsive mechanism deriving motion from one of said shafts and controlling the power flow of the power mechanism to effect the stepwise change of the gear ratios in accordance with speed changes of the said shaft.

36. In transmission mechanism the combination of a power shaft; a load shaft; change speed mechanism between the two for changing the speed ratios; speed responsive mechanism derving motion from one of the shafts controlling the gear changing mechanism; and means for varying the speed ratio between the speed responsive device and the actuating shaft.

37. Transmission mechanism as set forth in claim 35 provided with means for varying the responsiveness of the speed responsive mechanism to a given speed of the actuating shaft.

38. In transmission mechanism the combination of a power shaft; a load shaft; change speed gearing between the two providing a plurality of stepwise gear changes; power mechanism independent of a given torque of the load shaft and adapted to effect the movements of the change speed gearing to change gear ratios; speed responsive mechanism deriving motion from one of said shafts and controlling the power flow of the power mechanism to change the gear ratios in accordance with speed changes of the said shaft; a prime mover; a power control for the prime mover; means for varying the action of the speed responsive device; and means coupling the power control with the said action varying means, whereby the former may actuate the latter.

39. Transmission mechanism as set forth in claim 38 provided with means for actuating the speed varying means independent of the power control.

40. In transmission mechanism the combination of a power shaft; a load shaft; change speed mechanism between the two for changing the speed ratios; speed responsive mechanism deriving motion from one of the shafts controlling the gear changing mechanism; means for varying the speed of the speed responsive mechanism relative to the actuating shaft; a prime mover; a power control for the prime mover; and means coupling the power control with the speed varying means of the speed responsive device, whereby the former may actuate the latter.

41. Transmission mechanism as set forth in claim 40 provided with means for actuating the speed varying means independent of the power control.

42. Transmission mechanism as set forth in claim 35 in combination with a prime mover; a power control for the prime mover; means for varying the action of the speed responsive device; and means coupling the power control with the said action varying means, whereby the former may actuate the latter.

Signed at Toronto, Canada, this 28th day of July, 1931.

EUGENE F. PONCELET.